United States Patent
Hill et al.

(10) Patent No.: US 7,133,874 B2
(45) Date of Patent: *Nov. 7, 2006

(54) PROTOTYPING MODEL FOR COMPONENTS OF A SOFTWARE PROGRAM

(75) Inventors: Timothy J. Hill, Woodinville, WA (US); Bruce J. Beachman, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

This patent is subject to a terminal disclaimer.

(21) Appl. No.: 10/109,211

(22) Filed: Mar. 28, 2002

(65) Prior Publication Data

US 2003/0120678 A1    Jun. 26, 2003

Related U.S. Application Data

(60) Provisional application No. 60/341,511, filed on Dec. 13, 2001.

(51) Int. Cl.
*G06F 7/00* (2006.01)
*G06F 9/44* (2006.01)

(52) U.S. Cl. .................. 707/102; 717/120; 717/121

(58) Field of Classification Search ........ 717/120–122; 707/104.1, 102

See application file for complete search history.

(56) References Cited

U.S. PATENT DOCUMENTS

| | | | |
|---|---|---|---|
| 5,339,435 A * | 8/1994 | Lubkin et al. ............... | 717/121 |
| 5,495,571 A | 2/1996 | Corrie, Jr. et al. ............ | 714/38 |
| 5,983,242 A | 11/1999 | Brown et al. ............... | 707/203 |
| 6,023,710 A | 2/2000 | Steiner et al. ............... | 707/204 |
| 6,067,551 A | 5/2000 | Brown et al. ............... | 707/203 |
| 6,347,294 B1 | 2/2002 | Booker et al. ................ | 703/28 |
| 6,487,713 B1 * | 11/2002 | Cohen et al. ............... | 717/105 |
| 6,519,767 B1 | 2/2003 | Carter et al. ................ | 717/140 |
| 6,633,888 B1 * | 10/2003 | Kobayashi .............. | 707/103 R |
| 6,789,255 B1 | 9/2004 | Pedrizetti et al. | |
| 2003/0110482 A1 | 6/2003 | Ferguson et al. | |
| 2003/0187929 A1 | 10/2003 | Pugh et al. | |
| 2004/0015953 A1 | 1/2004 | Vincent | |

OTHER PUBLICATIONS

IBM, "IBM Embedded Development Kit of PC DOS and of Windows® 3.1," Copyright 1999, 4 pp.
Quinnell, "PC/Internet Boom Drives Embedded-Systems Trends," *The Electronics Industry Yearbook/2000*, pp. 193-194.
Bruno et al., "Pebble: A Component-Based Operating System for Embedded Application," Lucent Technologies, Mar. 30, 1999, pp. 1-27.
"Linus as an Embedded Operating System," SSV Embedded Systems 2000, pp. 1-10.

* cited by examiner

*Primary Examiner*—Kakali Chaki
*Assistant Examiner*—Insun Kang
(74) *Attorney, Agent, or Firm*—Lee&Hayes, PLLC

(57) ABSTRACT

A system and method for generating run-time images of a software program, such as an operating system, builds a run-time image from a plurality of selected software program components, each of which is a discrete packet of functionality. Each component not only specifies its properties and resources but also provides script for its own build behavior. To build the run-time image, a configuration is constructed to include instances of selected components, and the scripts of the instances are invoked such that each component instance builds itself into the run-time image. A prototyping scheme is provided for a component to inherit its properties, resources, and script from other components.

8 Claims, 7 Drawing Sheets

PROTOTYPING MODEL FOR COMPONENTS OF A SOFTWARE PROGRAM

TECHNICAL FIELD OF THE INVENTION

This invention relates generally to the development of software programs, and more particularly to the generation of run-time images of software programs, such as operating systems.

BACKGROUND OF THE INVENTION

Operating systems are at the heart of all computer systems or computerized devices. An operating system provides an environment in which software applications are designed to operate. To that end, the operating system manages and schedules the resources of the computer or device it resides in, and provides various function modules and interfaces that can be used by the applications to accomplish their tasks.

Over the last two decades, computer operating systems, especially those for use on personal computers, have become increasingly sophisticated and powerful. Every new released version of an operating system tends to be a major step over the previous one, with the addition of numerous new features and functions. As operating systems become more powerful, they also grow tremendously in terms of size and complexity. For instance, the popular Microsoft DOS operating system of nearly two decades ago could fit on a few floppy disks. In contrast, the recent versions of the Microsoft Windows operating systems typically require tens of megabytes of storage and operation space and contain thousands of files, library functions, and program interfaces. As an operating system becomes bigger and more complicated, it is also more difficult for its developers to keep track of all the different modules and files of the operating system to ensure that they will work properly individually and together.

The difficulty of grappling with the complexity of a modern operating system is especially acute in the case of developing "embedded operating systems." The term "embedded operating system" is commonly used to refer to a run-time image of an operating system that supports only a subset of functions and features of a full-fledged operating system developed for use on a regular computer. Embedded operating systems are needed for many different types of computerized devices, such as set-top boxes and information appliances. Those devices are typically fixed-function devices with limited resources. They do not need and also cannot support the rich functionality and flexibility of a regular operating system. By incorporating only those functions and resources needed by the fixed-function device on which it will run, the amount of storage, both persistent (e.g., Flash ROM or hard disk) and temporary (RAM), of an embedded operating system can be made much smaller than that of a regular operating system.

The conventional approach of developing embedded operating systems is to construct them using the binary modules or libraries of an existing regular operating system. Modules providing the functions needed by the device are selected and linked to form the run-time image. To that end, the developer of the embedded operating system is required to have knowledge of how each selected module should be included as a part of the run-time image, and the program responsible for creating the run-time image has to be coded accordingly to handle each module properly. This, however, can be a daunting task. Each module has its particular properties and requirements for resources, such as files to be copied and system settings (e.g., registry keys) to be set, etc. Moreover, the modules are often interdependent, i.e., the proper operation of one module depends on the existence or exclusion of other modules. Furthermore, multiple versions of a given module may have been created during the development process, and it is necessary to keep track of those versions so that a proper version can be selected for the target device. The developer of the embedded operating system has to know all these details about the modules of the regular operating system in order to properly use them in constructing the run-time image. As the regular operating system becomes more complex, keeping track of these details can be extremely difficult.

Furthermore, different devices often require different combinations of modules tailored for their specific functions. A program coded to construct a run-time image from a particular combination of existing modules suffers from inflexibility, as it cannot be used to handle different combinations. It is, however, impractical to attempt to code a program that knows how to handle every available module of the regular operating system so that it is capable of constructing run-time images from any combination of the modules.

SUMMARY OF THE INVENTION

In view of the foregoing, the present invention provides a system and method for building run-time images of a software program, such as an operating system, from a plurality of selected software program components, each of which is a discrete packet of functionality. Each component specifies its properties and resources, and provides script for its own build behavior. A component may explicitly contain data defining its properties, resources, and script, or may inherit them from other components through a prototyping relationship. Each component may also specify dependency data, which define dependencies among the components and component groups in terms of component inclusion/exclusion in the run-time image and the orders in which the components are built into the run-time image.

The system of the invention provides a general framework for managing components and using the components to build run-time images. The description data for the available components are stored in a database, and the files constituting the components are stored in a repository. The description data for a component defines the properties, resources, and script defining the component's build logic. During a build process, components are selected from the database for use in a configuration. Instances of the selected components are included in the configuration. The scripts of the component instances in the configuration are then invoked to build each of the selected components into the run-time image.

To facilitate the tracking of different versions of the components, a versioning scheme is provided that differentiates between revisions and upgrades of an item. An upgradeable item, such as a software program component, has a version-independent identifier, a version-specific identifier, and a revision number. The version-independent identifier of the item stays the same throughout revisions and upgrades. The version-specific identifier, on the other hand, is changed to a new value when the item is upgraded. Thus, there may exist different upgrade versions of the same item that share the same version-independent identifier but have different version-specific identifiers. The revision number is increased each time the item is modified so that the newest version can be easily identified. An item to be retired may be marked as end-of-life and may contain data identifying item or items for replacing it.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
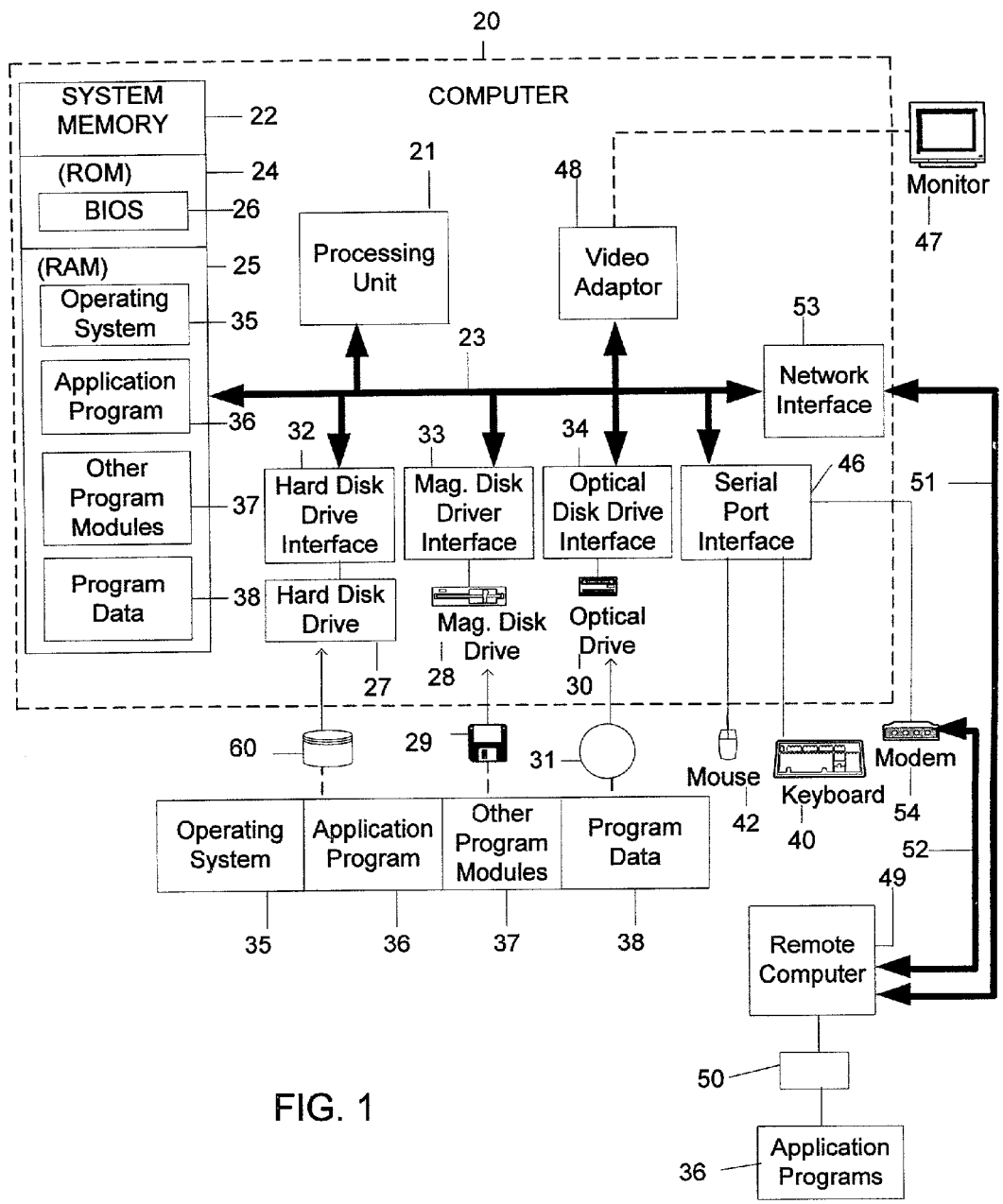
FIG. 1 is a block diagram generally illustrating an exemplary computer system on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the invention will be described in greater detail with reference to FIGS. 2–7. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
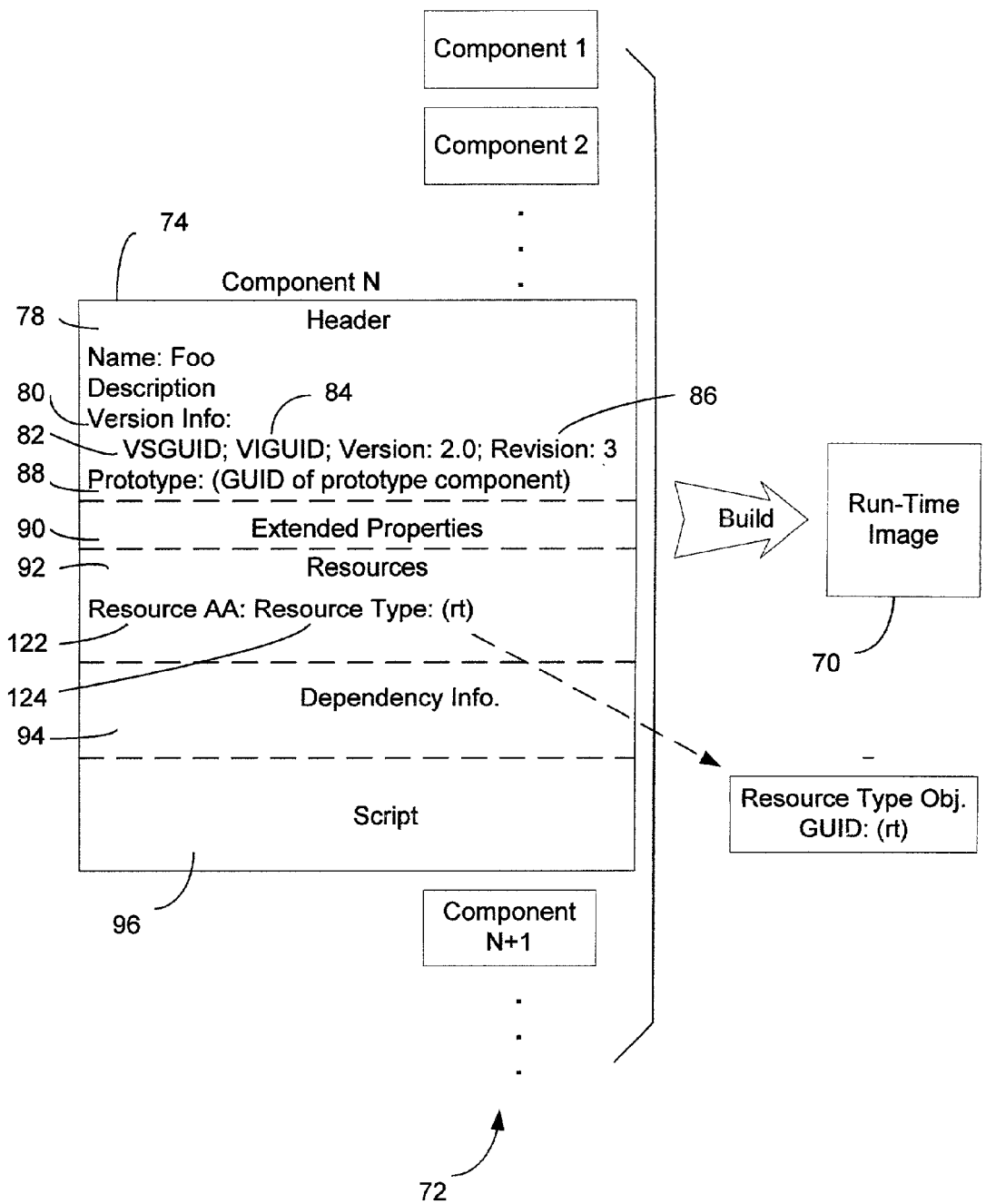
FIG. 2 is a schematic diagram showing a plurality of software program components for building a run-time image in accordance with the invention.

Tuning now to FIG. 2, the present invention is directed to a new approach to the generation of a run-time image 70 of a software program, and provides a generic architecture that can be used for building various types of software products, especially run-time images. By way of background, many modern operating systems and applications are not shipped to end-users in a ready-to-run state. Instead, additional processing is required to complete the integration onto the end-users ("target") computer, a process typically known as "Setup" or "Install". This process occurs "online", that is, on the target computer system. In contrast, the "build" process described herein according to the invention provides a means (among other things) of performing the "Setup" process "offline" (i.e., not on the target computer). The result of this process, known as a "run-time image" is a ready-to-run operating system or application that generally does not require, or requires very little, additional "Setup" or "Install" processing on the target computer. The invention is especially advantageous for building run-time images of operating systems (i.e., "embedded operating systems"), and in a preferred embodiment of the invention described below the software program is an operating system. It will be appreciated by those skilled in the art, however, that the generic architecture of the invention is equally applicable to building run-time images of other types of software programs.

The architecture of the invention is based on an important concept of "componentization"—the run-time image is constructed using software program "components" as building blocks. The term "component" as used in the architecture of the invention means a discrete packet of functionality that can be included in the final run-time image. For example, for an operating system, the components 72 may include Web browsers, transport protocol drivers, device drivers, etc. Typically, the functionality of an operating system component is defined by a series of files that are to be copied into the run-time image and a set of system settings/values that have to be added or edited. The functionality defined by a component can vary widely. A simple component, such as one that enables automatic logon, might simply set one or more system settings (e.g., registry keys). Other components might define device drivers, services, or even complete applications.

The componentization concept of the invention presents a new paradigm for the development of future operating systems. In this paradigm, the development of an operating system starts with providing a collection of operating system components, which may be newly developed or taken from existing operating systems. A subset of the available components is then selected based on the functions they provide and the functions to be supported by the target run-time image. The selected components are then combined in a "build" process to generate an operating system run-time image. The operating system components available for the build process may be derived from an existing operating system for general-purpose computers by dissecting the existing operating system into a series of distinct components. For example, the existing operating system may be the recently released Windows XP operating system of Microsoft Corporation. It should be appreciated, however, that the present invention is not limited to using only components derived from existing operating systems for regular computers, but may include new components designed specifically for use to build the run-time image.

As will become clear from the detailed description below, the invention provides many important advantages over the conventional approaches to the generation of operating system run-time images. For example, the architecture of the invention provides scalability of operation and can be used to construct operating system run-time images of a wide range of complexity. It also provides tremendous extensibility to allow new functions and different upgrades of components to be added easily and freely. It also supports multiple platforms with variations such as different operating systems, CPU types, different locale, etc.

Moreover, the new paradigm of building an operating system not only can be used to build "embedded" operating systems for special-purpose fixed-function devices, but is equally applicable to the creation of operating systems for general-purpose consumer personal computers. For instance, a next-generation operating system for personal computers may be shipped as files containing all of its various components, together with software implementing the architecture for building run-time images and user interface software designed to allow a user to conveniently select components that provide desired functions. Using the user interface, a regular consumer can easily customize the operating system for a general-purpose computer by selecting the desired functions. Once the selections are made, instances of the components are automatically built into the operating system run-time image on the consumer's computer.

In accordance with a feature and central concept of the invention, each of the components 72 is supposed to know how to build itself into the run-time image. In other words, each component provides the logic for its own build behavior. Thus, the process of building the run-time image involves mainly the invocation of each selected component to build itself. The build logic of a component may be supplied in different coding formats. For instance, in a preferred embodiment described below, the build logic of a component is in the form of script associated with each component. The script preferably is written in a widely used scripting language, such as Visual Basic Script or Java Script.

By way of example, FIG. 2 shows a data structure used in a preferred embodiment that contains data describing an operating system component. As shown in FIG. 2, the description data (also called "metadata") for a component 74 include a header portion 78, which contains certain standard properties of the component, such as the name of the component, a description of the component, and some versioning data 80. In accordance with a feature of a preferred embodiment of the invention, the versioning data includes a version-specific (VS) globally unique identifier (GUID) 82, a version-independent (VI) GUID 84, and a revision number 86, the meanings and purposes of which will be described in greater detail below. In accordance with another feature of a preferred embodiment, the component may include a Prototype property 88 that contains a GUID of a "prototype component" from which the component inherits properties, resources, and script, as will be described in detail below.

The component description data further include data identifying extended properties 90 and resources 92 of the component. The resources may be, for example, files containing binary code of the component that need to be copied into the run-time image, system settings that have to be set, as well as other types of resources that can be flexibly defined and constructed, such as by using Resource Type properties and objects as will be described in greater detail below. In accordance with another feature of a preferred embodiment of the invention, the component description data include dependency data 94 that specify how the component depends on other components of the operating system. The types of component dependency and how the dependency is handled in building the run-time image will be described in greater detail below.

As mentioned above, a key concept of the invention is that each component provides the logic of how to build itself, and in a preferred embodiment the logic is provided in the form of script. In the example illustrated in FIG. 2, the script 96 is shown as part of the component description data. It will be become clear from the description below, however, that a component is not required to explicitly include in its description data any script for its build logic. Instead, a component may "inherit" the scripts of other components. Thus, by specifying its inheritance from other components, the component implicitly provides the script it needs to build itself.

By requiring each component to identify its own build behavior, a generalized framework can be used for the management and the selection of components for run-time image generation that is decoupled from platform-specific requirements. In a preferred embodiment shown in FIG. 3, a system 100 for building operating system run-time images 70 from components includes a database 102 for storing the component description data as described above with reference to FIG. 2 for all the available components 72.

The database 102 also contains metadata describing other types of items involved in the build process. One type of such items is the platform type. Platforms 104 are used to define the target operating system, CPU, locale, and other variants that are handled at the global database level. For example, one platform might be "Windows Embedded (×86)—US English." Similar to the components, a platform also contains script. This script 106 is inherited by each configuration (described below) of the run-time image that is based on that platform. When a new configuration is created based on a platform, the script of the platform is copied into the corresponding Configuration object 250 and is subsequently saved as part of the configuration file. When the configuration is used to build a run-time image, the platform script is invoked to drive operations such as dependency checking and overall build processing. In one implementation, when creating a new configuration, the user interface tool first presents a list of available platforms 104. Once the user selects a platform, only the portions of the database that are associated with that platform will be accessible when editing the configuration.

Other types of objects described in the database include groups 110, resources 112, and resource types 116, etc. Groups are collections of components defined for different purposes. One particularly important type of groups concerns component dependencies, which are described in greater detail below.

Each of the resource type items 116 in the database 102 describes a Resource Type object that can be invoked during the build process to construct resources of its type needed by instances of components selected for building the run-time image. As shown in FIG. 2, a resource 122 specified in the metadata of a component may include a "Resource Type" property 124 that specifies the GUID of a resource type. As will be described further below, this Resource Type property is used during a build process to invoke the corresponding Resource Type object to construct the resource. To that end, the Resource Type object contains script defining the logic for constructing a resource of its type. The use of resource type objects thus provides a degree of independence between components using the resources and the resources themselves. This independence allows new types of resources to be added easily to the system and existing types to be modified easily, without having to modify all the components that use those resources.

The binary files 128 that constitute the various components are stored in one or more repositories 132 of the system. A repository is an archive that is used as a source of binary files during the construction of the run-time image. Files associated with the selected components are copied from the repositories into the run-time image during the build process. In one implementation, each repository may have either a single folder that contains the binary files, or a CAB file containing the files.

The system further includes one or more configuration files 140. Each configuration file is in essence a manifest that lists instances of all the components that have been selected for building a run-time image, including data describing all the properties, resources, and scripts for building instances of the selected components. It is possible for a single configuration to contain multiple instances of the same component. In a preferred embodiment, configurations are stored as XML files. A single configuration may be used for building several different types of run-time images, such as "free" or "checked" versions. Each configuration is bound to a specific platform when it is created. Each configuration file contains global information about the run-time image that comes from the platform object 162.

The component database 102, repositories 132, and configuration files 140 may be populated with data by an import process in which the respective contents are imported from carrier files 146. In one embodiment, the carrier files are XML files. They contain the definitions of all the item types described in the database. The component database 102 functions essentially as a data warehouse. In a preferred embodiment, once imported, the data in the database 102 are not editable. In this regard, various versions of a component may coexist in the database. This aspect is described in greater detail below in connection with a versioning model used in a preferred embodiment.

Figure 3:
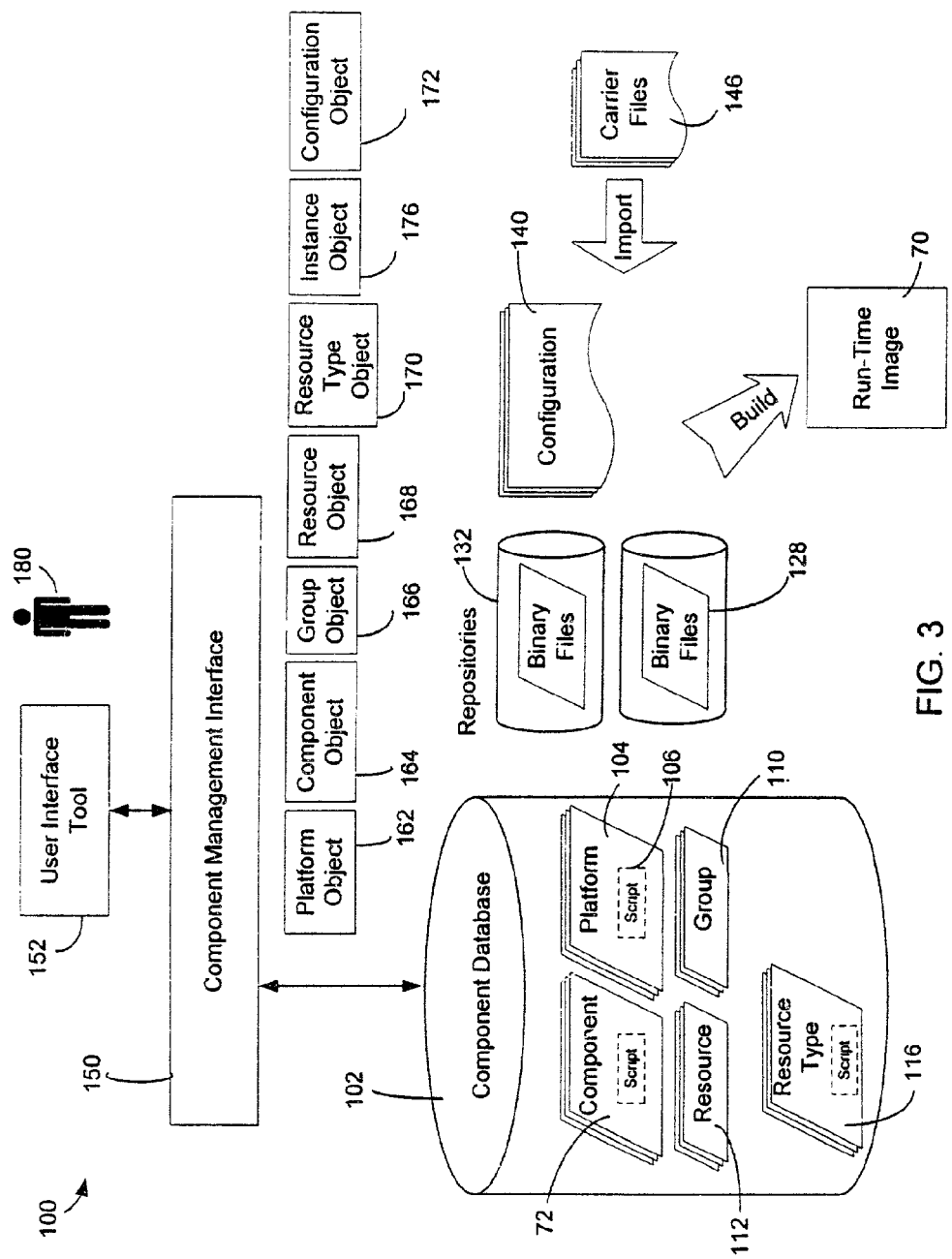
FIG. 3 is a schematic diagram of a software development system embodying an architecture for building run-time images from components in accordance with the invention.

In the system shown in FIG. 3, a component management interface (CMI) module 150 is provided for managing the build process. The CMI 150 provides an interface between a user interface tool 152 and the other modules of the system. The interface is exposed as a series of objects that map onto the various elements described in the database 102, instances of components, and configurations 140, etc. For instance, as shown in FIG. 3, the objects include platform objects 162 components objects 164, group objects 166, resource objects 168, resource type objects 170, configuration objects 172, component instance objects 176, etc. These objects can be accessed in the build process not only by the CMI 150 but also by the scripts of the different objects.

The user interface tool 152 interacts with the other modules in the system through the interface provided by the CMI 150. The user interface tool 152, working with CMI 150, provides user interface functions to allow a user 180 to perform various tasks such as browsing available components 72 in the database 102, importing data and files from carrier files into the database and repositories 132, selecting components for constructing a configuration 140, initiate a build process based on a configuration, and responding to queries and entering inputs as part of the interactive build process.

To construct a run-time image 70, the user 180 may start by browsing the available components 72 in the database 102 for the functions they support, and selecting desired components for inclusion in a configuration. Alternatively, the user may select one of the configuration files 140 and edit that configuration by adding or removing components. As mentioned above, to allow the user interface tool 152 to access the data items in the database and the configuration file, the CMI 150 creates an object for each component, platform, group, or configuration referenced to by the user interface tool. In a preferred embodiment, the objects are COM automation objects.

In addition to the component objects, a component instance object 176 (or "instance object") is created for each component selected from the components in the database for inclusion in a configuration. As explained below, the description data of the instance object 176, which include its properties, resources, and scripts, may be different from the description data for the component as stored in the database. This is because each component is allowed to inherit from another component, and all the properties and resources of the components in the inherency chain are "collapsed", and their scripts "coalesced," into the instance object, as will be described in greater detail below.

Although the CMI 150 provides the interface between the various operating system related elements and the user interface tool 152, it is a generic module in that it is not tied to any particular operating system platforms. Moreover, in accordance with the componentization approach of the invention, the CMI 150 is not required to have "centralized" knowledge of how to build each of the components described in the database for inclusion in a run-time image operating system. This is because the components 72 provide their own logic for building themselves. This decentralized build operation provides inherent flexibility and extensibility of the architecture, because the system can be used to construct run-time images from combinations of different components of widely varying platforms, without having to rebuild or alter the CMI.

Component Inherence and Prototyping

Many operating system components have very similar build behavior. In other words, the operation of building a given operating system component may involve steps that are commonly performed in building other operating system components. For instance, the build operation of many operating system components involve copying a given list of files from the repository 132 to the run-time image, and setting a given list of system settings, such as registry keys. As described above, in accordance with the invention, each component is required to provide its own build logic, and in a preferred embodiment the logic is provided as script. Since the build operations of components often involve similar steps, their build scripts can have a significant degree of overlap. Moreover, functionally related components, such as different Web browser components that are substantially identical but with different home pages, tend to have similar properties and resources.

In accordance with a feature of a preferred embodiment of the invention, instead of requiring each component to provide a full set of script for its build behavior, a component may provide the script implicitly by specifying its inheritance from a second component. In this context, the second component is said to be the "prototype component" of the first one. Besides the script, the inheriting component also inherits the properties and resources of its prototype component.

In a preferred embodiment, a single-inheritance model is used. Each component can only, but is not required to, depend on another component. As shown in FIG. 2, the header portion 78 of the description data of a component 74 may include a "Prototype" property 88, which contains the GUID of its prototype component.

For example, a component X may specify that it inherits from a component Y. As a result of the inheritance, the component X inherits the script of the component Y and also all of its properties and resources. The component X has to provide its properties, resources, and script only if they are different from those of the component Y. The inheritance can be chained, similar to the class inheritance of the C++ programming language. Thus, the component Y may in turn inherit from a component Z, and so on. The chain ends with a "default" prototype component, from which all other components of the platform are derived directly or indirectly. This default prototype component is provided for each platform and defines the generic build behavior for components of that platform.

This feature of component prototyping or inherence provides significant saving of the database memory space. It allows properties, resources, and script common to many components to be stored in one common prototype component and then inherited by all the components derived from that prototype component. The inheritance model is especially advantageous for component scripting. As described above, all the build logic associated with a component is expressed as script that may be stored in the component description data. Without prototyping or inheritance, all components have to contain their complete script blocks. Prototype inheritance allows many components to simply inherit the default script from the default prototype component. It also significantly simplifies the development and management of the components, because each component only has to provide properties, resources, and script that are different from its prototype component. Their features, functions, and build behavior can be easily altered by modifying the prototype component.

As mentioned above, when a component is instantiated in to a configuration (i.e., it is selected for inclusion in the configuration), the CMI creates an instance object corresponding to that component. The CMI also creates a special global object named "cmiThis," which contains a reference to the current instance object.

Figure 4:
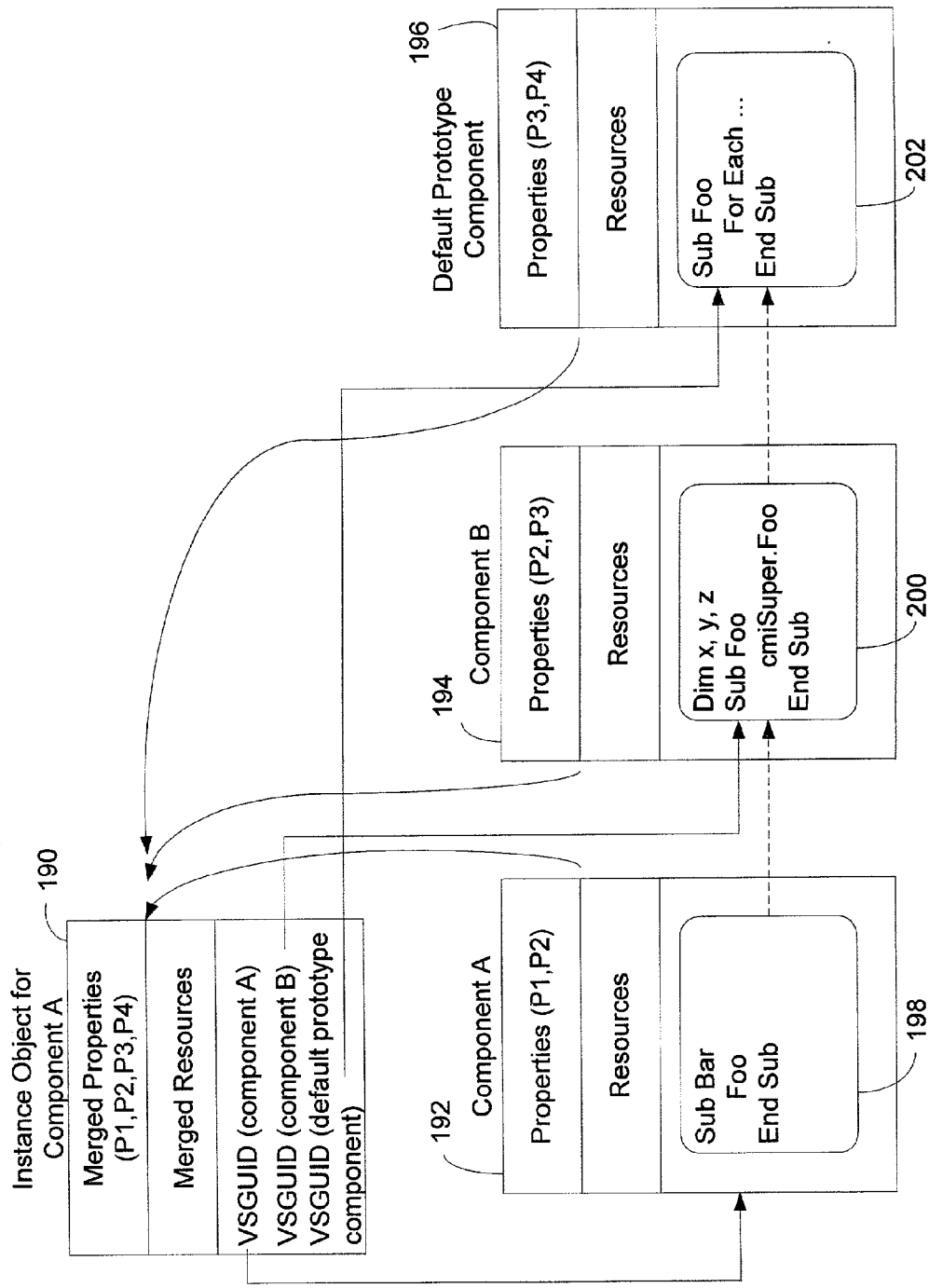
FIG. 4 is a schematic diagram showing an example of an instance object of a component and its prototype components.

For illustration purposes, FIG. 4 shows an exemplary inheritance object 190 for a component A, denoted 192. In this example, the component A has a prototype component B, denoted 194, which in turn has the default prototype component 196 of the selected platform as its prototype. The inheritance of properties and resources is facilitated by a mechanism that "collapses" the properties and resources of the entire component chain (including components 192, 194, 196) when a component instance object 190 is created. The individual sets of properties from each component in the chain are merged into a single set of properties in the instance object 190 by an aggregation process. Each individual property in a component is assigned an identifying name. Normally, the aggregation process simply copies all the properties of all the components in the component chain to the instance object. However, if a property of the same name exists in several components in the component chain, then only the property in the "most derived" component is copied to the instance object. The term "most derived" means the component that is furthest "up" the prototype chain of components. For example, in FIG. 4, component 192 is the "most derived" and component 196 is the "least derived". It will be observed that the Default Prototype component will always be the "least derived" component in the component chain of any instance since it always appears at the end of the component chain.

Thus, there will only be at most one property with a given name copied to the instance object by the aggregation process. As an example, assume that component 192 has properties "P1" and "P2", component 194 has properties "P2" and "P3", and default prototype component 196 has properties "P3" and "P4". After the aggregation process, the instance object 190 will contain properties "P1" and "P2" from component 192, property "P3" from 194 and property "P4" from 196. Property "P2" from 194 and property "P3" from 196 will not by copied to the instance since these are masked by the more-derived properties in components 192 and 194. The resource collapsing mechanism is identical to that described here for aggregating properties. A consequence of the collapse process described is that a component that inherits from another component via the prototype mechanism may over-ride the property and resource values of the prototype component as desired simply by supplying alternative values for those properties and resources.

In contrast to the "collapsing" operation on the inherited properties and resources, when an instance object is created from a component, all the scripts in that component and the components in its prototype chain are "coalesced" into the script text for the instance object. The coalescing operation simply adds the script blocks one after another. Thus, the total script text for an instance object comprises multiple distinct script blocks, one from each component in the prototype chain, if that component provides its own script. In the example of FIG. 4, the script of the instance object 190 for the component A includes the script blocks of the components A, B, and R. In a preferred embodiment as illustrated in FIG. 4, instead of copying the scripts of the components directly into the instance object, the instance object contains the version-specific GUIDs (VSGUIDs) (described below) of the components in the chain. Thus, the instance object 190 contains the VSGUIDs of the component A, component B, and the Default Prototype component. The VSGUIDs of the components allows the CMI to link the individual script blocks 198, 200, 202 of the components stored in the database 102 together to form a single script block. The linking forms a hidden list of individual script sites that are linked in the same order as the component prototype chain. At the end of the chain is the script block 202 of the platform-defined default prototype component. The linking is shown using dotted arrows in FIG. 4.

When the script procedure of an instance object is accessed (or any other instance script global), the CMI attempts to locate this procedure in the script block at the head of the script list. In the example of FIG. 4, this is the script block 198 of the component A. If the procedure is located in that script block, it is executed. If not, the CMI searches in the next script block in the list. This search continues until the procedure is located. For example, if the procedure Foo is invoked against the chain shown in FIG. 4, the Foo procedure in the second script block 200 executes. If the Bar procedure is invoked, the procedure in the first script block 198 executes. Thus, the script blocks from individual components in the prototype chain are linked into a simple single-inheritance object model, where "upstream" components can over-ride procedures supplied by "downstream" prototypes.

This same search process also applies to procedure invocations that occur within the script itself. If a procedure is invoked that is not found in the current script block, the CMI will search the script chain starting with the next script block down the chain. In FIG. 4, the Bar procedure in the script 198 invokes the Foo procedure. Since this is not present in the current script block, the CMI will locate and execute the Foo procedure in the second script block 200. This search process applies to all global objects in the script. This means, for example, that the Bar procedure in FIG. 4 can access the variables x, y and z in the downstream script block.

As shown in the Foo procedure in FIG. 4, upstream script can over-ride procedures in downstream script. However, sometimes it might be necessary for an upstream procedure to explicitly invoke the original downstream version of the same procedure. In this case the Foo procedure cannot simply call Foo again, as this will be interpreted as a recursive call to the local procedure. Instead, the CMI provides an additional IDispatch reference in a special global method called "cmiSuper." This IDispatch interface starts searching at the next script block downstream from the current block. Thus, the Foo procedure in the second script block can use cmiSuper.Foo to invoke the Foo procedure in the third script block 202.

There is a third way the search for a procedure in the scripts can be carried out. As noted above, the CMI provides a cmiThis variable that provides a reference to the instance object. Since Instance.Script exposes the composite IDispatch interface, cmiThis.Script also exposes this interface. Therefore a procedure can be invoked via this interface, for example cmiThis.Script.Foo. Since this invocation occurs directly on the CMI composite IDispatch, this is equivalent to an upstream search of the chain. That is, the search starts at the very top of the chain. In object-oriented programming terms this is the equivalent of a virtual function invocation, since it allows a procedure in a downstream component to invoke procedures in upstream components.

Component Dependencies

Besides the prototyping inherence described above, a component may be related to the other components through component dependency. Component functionality is rarely defined in isolation. Typically, a component requires the services of other components in order to function correctly. For instance, a browser component requires the existence of a TCP component, which in turn requires a medium driver component. Component dependency may also be in the form of the order in which the component instances should be built into the run-time image. In a preferred embodiment, a rich dependency model is provided that allows complex inter-component relationships to be described. These relationships ensure that adequate support is available in a run-time image for the selected components, and that the components are built into the run-time image in the correct order.

The dependency information is integrated into the component database. As illustrated in FIG. 2, the description data of a component 74 include dependency data 94. This dependency information is included in the configuration when the corresponding component instance is copied into the configuration object. In the following description, to identify the dependency relationship between components, if component A depends on component B, component A is referred to as the "source" component, and component B is referred to as the "target" component.

The inclusion of the component dependency information in the description data of the components makes the dependencies well defined and easy to keep track of. The clarity of the dependencies among the components provided by this scheme is extremely valuable in the process of debugging the operating system, wherein the cause of an error may have to be traced through many inter-dependent components.

The dependency information is used in three ways. First, it is used to validate a configuration, by checking that all the dependency requirements of components included in a configuration have been satisfied. Second, it is used to automatically include "target" components when a source component is included in a configuration. Third, it is used to control the order in which components are added to the run-time image at build time. The logic for performing these tasks is included in the script of the configuration object.

Generally, the simplest dependency specifies that one component depends upon another component. For example, X→Y means "component X depends on component Y." Here, the symbol "→" is a used generally to represent a dependent relationship, which may of one of different forms and types. In this example, component X is the "source" component and component Y is the "target" component. In a preferred embodiment, all dependencies are specified by the source component. That is, the dependency rule of the previous example would be included as part of the definition of component X rather than component Y.

Dependencies are transitive. If X depends on Y and Y depends on Z, i.e., X→Y and Y→Z, then component X implicitly depends on component Z. The transitive property of dependencies means that including a single component in a build can cause a cascade effect that includes many other components via direct and indirect dependencies.

A component may also depend on a group. The simple dependencies between components directly connect one component with another. Group dependencies, in contrast, indirectly connect components via dependency groups. Each component can belong to any number of dependency groups. For example, all network interface card (NIC) drivers might belong to a "NICDriver" group. Group dependencies are resolved by means of group membership. For example, if component Y is a member of group G, then X→G effectively means X→Y. This is expressed as X→G (Y), which states the component X depends upon group G, and group G has component Y as a member.

In a preferred embodiment, a group cannot depend on another component or group. In other words, the relationship G→Y is not valid. Also, groups cannot contain other groups as members, only components. This means that "double indirect" component dependencies are not allowed. For example, X→G1(G2) is not allowed.

An advantage of group-based dependencies is that they add a level of indirection between components. This allows a component to express its dependencies even before the target components in the group have been fully authored. Groups are also very useful with some of the more advanced dependency types described below.

In the context of building an operating system run-time image, there are three general forms of dependencies: inclusion, build order, and registry setting. Inclusion dependencies cause the addition or exclusion as necessary during configuration. Build order dependencies control the order in which components are built during the build process, but do not cause automatic inclusion of components. Registry setting dependencies also control the build order, but they are generated automatically by the CMI as a result of an analysis of component registry inter-dependencies.

In a preferred embodiment, dependency classes are defined based on these three forms of dependency, and each dependency belongs to a class. The different dependency classes are shown in Table 1.

TABLE 1

Dependency Class Values

| Name | Value | Symbol | Meaning |
|---|---|---|---|
| DependencyClassInclude | 1 | & | Include dependency. This is the default dependency class. |
| DependencyClassBefore | 2 | > | Build before dependency. |
| DependencyClassAfter | 3 | < | Build after dependency. |
| DependencyClassRegistry | 4 | $ | Implied registry dependency. |

Dependencies in the Include class control the inclusion or exclusion of components in a run-time image. Dependencies in the Before and After classes are build dependencies. Build dependencies do not cause the inclusion or exclusion of components, but instead are used to restrict the order in which components are built during the build process. Build dependencies do not imply include dependencies. Dependencies in the Registry class are a special variation of "build before" dependency. They are not explicitly expressed in a component, and are instead synthesized by an analysis of registry key processing specified by individual components. However, their action is identical to a normal build-before dependency. Dependency classes can be used with groups and dependency types as described below.

The different types of dependency within the Inclusion dependency class are shown in Table 2.

TABLE 2

Inclusion Dependency Type Values

| Name | Value | Symbol | Meaning |
|---|---|---|---|
| DependencyTypeFromGroup | 0 | G→ | Take type from group. |
| DependencyTypeExactlyOne | 1 | 1→ | Exactly one of the target components must be present. |
| DependencyTypeAtLeastOne | 2 | +→ | At least one of the target components must be present. |

TABLE 2-continued

Inclusion Dependency Type Values

| Name | Value | Symbol | Meaning |
|---|---|---|---|
| DependencyTypeZeroOrOne | 3 | ?→ | Either none or exactly one of the target components must be present. |
| DependencyTypeAll | 4 | *→ | All the target components must be present. This is the default dependency type. |
| DependencyTypeNone | 5 | 0→ | None of the target components may be present (exclusion). |

The FromGroup dependency is not actually a true dependency type. Dependency types can be specified in both components and groups. If a component specifies a FromGroup dependency type then the type of the dependency comes from the group, rather than from the component. The FromGroup dependency type is only valid in components, not groups, and the dependency target is required to be a group. If the component specifies any other dependency type, the dependency type in the component overrides the dependency type in the group. Thus dependency types in groups are, in effect, default types that are used only when a component specifies the FromGroup dependency type.

The "All" dependency (which is the default dependency type) means that all the components in the group are required by the source component. The symbol for an All dependency is *→. Thus, X*→G(A,B,C) means that component X depends upon all of group G. Since G has components A, B and C as members, this means that component X is dependent on components A, B and C.

The ZeroOrOne dependency type is a group dependency type and means that none or only one component in the "target" group can exist. The ZeroOrOne dependency has no meaning when used with a simple dependency.

The None dependency is, in effect, a logical "not" operation. For example, X0→Y means that component X is dependent on "not component Y," or that component X conflicts with component Y. When applied to groups, a None dependency is interpreted to mean that the conflict includes all the components in the group. For example: X0→G(A,B) means that component X conflicts with both components A and B in the group.

Certain self-referential dependency rules are valid. For example: X1→G(X,Y,Z) means that component X is dependent upon exactly one of group G, which includes component X as a member. This type of dependency can be used to author sets of components that are mutually exclusive.

It is possible to construct sets of dependencies that are internally contradictory. Most such sets involve the use of at least one None dependency in cyclic deadlock. For example, X0→X states that component X conflicts with itself. This makes the inclusion of component X impossible. Such a dependency rule is obviously invalid and easy to detect, but more complex contradictions are possible. The contradictions of dependency between the components are checked during the build process by the configuration object. If a contradiction is detected, the user interface tool is used to notify the user of the contradiction and request user input to resolve the conflict.

The semantics of the various dependency types are slightly different for the build order dependency class. Table 3 shows the various build-before dependency types, and table 4 shows the build-after dependency types.

TABLE 3

Build Before Dependency Type Semantics

| Type | Symbol | X → Y | X → G | Notes |
|---|---|---|---|---|
| Exactly One | 1→> | Not valid. | Not valid. | |
| AtLeast One | +→> | Y is built before X. | Not valid. | |
| ZeroOrOne | ?→> | Not valid. | Not valid. | |
| All | *→> | Y is built before X. | All members of G are built before X. | This is the default dependency type. |
| None | 0→> | Not valid. | Not valid. | Use the semantically equivalent "build all after". |

TABLE 4

Build After Dependency Type Semantics

| Type | Symbol | X → Y | X → G | Notes |
|---|---|---|---|---|
| Exactly One | 1→< | Not valid. | Not valid. | |
| AtLeast One | +→< | Y is built after X. | Not valid. | |
| ZeroOrOne | ?→< | Not valid. | Not valid. | |
| All | *→< | Y is build after X. | All members of G are built after X. | This is the default dependency type. |
| None | 0→< | Not valid. | Not valid. | Use the semantically equivalent "build all before". |

Note that terms such as "all" and "at least one of" are modified when used in the context of build dependencies where the dependency target is a group. The terms are assumed to apply only to the subset of the group that is actually instantiated into the build. For example, X*→>G(A,B,C) is interpreted to mean that instances of components A, B and C are built before component X if they are included in the build. Thus, if the build includes components X, A and B the build order will be A, B and then X. The absence of component C is not considered an error. Note also that the "ExactlyOne" and "ZeroOrOne" types are not valid for build order rules. The semantics of such rules are unclear given that the component author has already constrained which components may be included using include rules. The exclusion of these rules also allows build order resolution algorithms to resolve in linear time instead of factorial time.

The inclusion dependencies are typically combined with build dependencies. For example, there may be one rule of X+→&G(A,B) specifying that component X requires at least one of components A or B to be included, and another rule of X→>A specifies that component A must always be built before component X. This means that if the set {X,A} is chosen the build order will be A then X, while if the set {X,B} is chosen the build order is undefined (and may be B then X or X then B).

Component Versioning

Through the course of development of an operating system, a component may be modified many times to remove bugs or to add functions. It is necessary to keep track of all the different versions of the components so that a correct version can be selected for use in building a run-time image.

In a preferred embodiment, a formal versioning scheme is implemented. The versioning scheme distinguishes between a "revision" or "update" (the terms are used interchangeably) to an object and an "upgrade" to an object. Revisions to an object conceptually generate a new version of the object that replaces earlier versions. Revisions typically refer to incremental modifications made during the development stage such that there is no need to preserve the old version once the new version is imported into the database. In contrast, an upgrade generates a new version that can co-exist side-by-side with the old version in the component database. An upgrade typically refers to modifications to the component after the component has already been released for use by customers.

The versioning scheme of the invention is designed to allow multiple different upgrade versions of a component to co-exist within the database and be clearly identified as different versions of the "same" component. For example, when a service pack ships a new "upgrade" version of a component, that version may be imported into the database without displacing the existing version. Existing configurations will continue to be built using the old version of the component that was used when they were authored, while new configurations can use the new version of the component. At a convenient time, a configuration that uses the old version can be manually or automatically upgraded to use the new version of the component.

In a preferred embodiment, the versioning scheme is applied to all primary objects in the database. Primary objects are stand-alone objects that are made available as a result of importing data into the database from a carrier file. Secondary objects, on the other hand, generally specify data that are logically contained within a primary object. For example, a Component object is a primary object and can specify a list of resources, and each resource is presented as a Resource object, which is a secondary object. Each primary object type in the database is classified by the type of versioning it supports as follows:

Immutable: These objects can not change. Alterations to immutable primary objects must result in the generation of a new object that is distinct from the old object on which it is based.

Revisable: These objects can be revised. A revised version of the object replaces all previous versions of that object in the database. In other words, a revised version of an object is not allowed to co-exist with the previous version of that object.

Upgradeable: These objects can be upgraded. An upgraded version is a new object that is distinct from previous versions, but can co-exist with these earlier versions in the database.

Revisable+Upgradeable: These objects can be both revised and/or upgraded.

To support this scheme, each primary object contains version information. Primary objects that are not upgradeable (i.e. are either immutable or revisable) are uniquely identified by a single version-specific GUID ("VSGUID") property. Each primary object that is upgradeable has an additional version-independent GUID ("VIGUID") property in addition to a VSGUID. In one implementation, only components and platforms are allowed to be upgraded. Each object further includes a Revision property, which is a simple ordinal value, where a higher number represents a "newer" version of the object. Revisions need not be sequential, but any changes that are made to an object should be accompanied by an increase in the value of this property.

For example, the component illustrated in FIG. 2 includes a VSGUID 82, a VIGUID 84, and a Revision Number 86. The VSGUID provides a unique object identification that is specific to an object and stays the same for different revisions of that object. The VIGUID, in contrast, provides a shared object identification that is common to all the different upgrade versions (which are viewed as different objects) of the "same" item in the database. Note that "sameness" in this context simply means that the objects having the same VIGUID. As an example, the objects having the same VIGUID may correspond to different upgrade versions of a Web browser component.

Besides the VSGUID, VIGUID, and the Revision value, the versioning information may also include a DateRevised property, a Released property, and a Version property. The DateRevised property stores the time and/or date of the most recent edit of the object. The Released property applies to component objects and is a flag that, if set, indicates that the component object has been released. A released component object is one that should not undergo further revisions. Any subsequent editing of the component will result in an upgrade to the component. The Version property is simply a comment used by the user interface tool to display a user-friendly version number, such as "v2.2".

Figure 5:
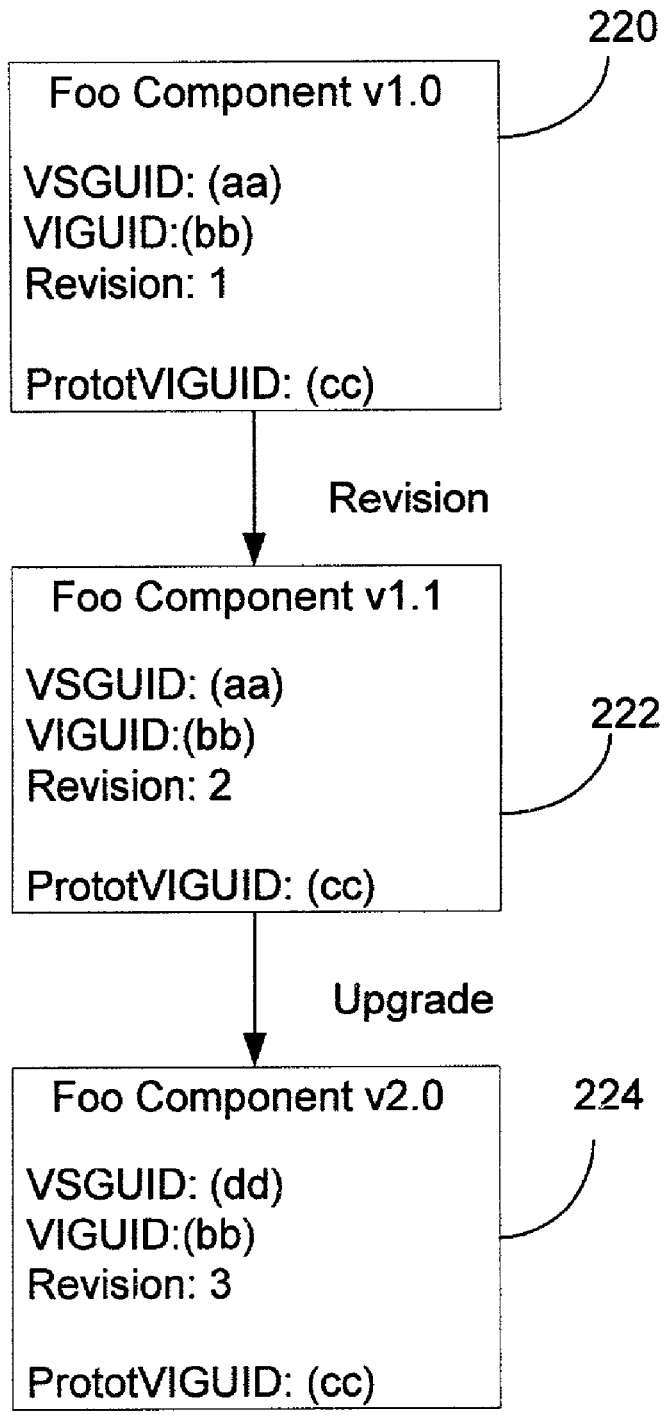
FIG. 5 is a schematic diagram showing objects corresponding to different versions of a component.

FIG. 5 shows an example of how the revision number, VSGUID, and VIGUID of a component named "FOO" are changed in accordance with the component versioning scheme described above. The three objects 220, 222, and 224 in FIG. 5 correspond to versions 1.0, 1.1, and 2.0 of FOO. The Revision values of the three versions are increased with each revision. Of these three objects, version 1.1 is a revision of version 1.0, and these two versions have the same VSGUID. Because version 1.1 is newer than version 1.0 as indicated by their Revision values, version 1.0 is removed from the database when version 1.1 is imported therein. Version 2.0, in contrast, is an upgrade of version 1.1 and has a different VSGUID. Accordingly, version 2.0 and version 1.1 can co-exist in the database.

The three different versions of Foo, however, share the same VIGUID, indicating that they are different upgrade versions of the "same" component. Their Revision values indicate which one is the most recent version. The VIGUID shared by them allows the user or the system to recognize that they represent different versions of the "same" component.

In general, a VIGUID component reference within the database 102 (FIG. 3) is assumed to refer to the most recent revision of the component, i.e., the version of the component with the greatest Revision value. For example, components specifying prototypes by the VIGUID of the prototype component. Thus, if a new version of a prototype component is imported into the database 102, all components inheriting from that prototype component will automatically refer to that new version.

In contrast, all cross-component references within a configuration 140 are by means of VSGUIDs of the components. When a component is instantiated into a configuration, all the VIGUID component references are converted into VSGUID references within the instance. The purpose of doing so is to "freeze" the instance information to refer to specific versions of the components. Thus, even if new versions of a component are later imported into the database, the configuration continues to refer to the old version. This feature ensures that configuration builds remain consistent, i.e., the same run-time image will be generated, regardless of changes made to the database.

Eventually many objects reach retirement, meaning that no new versions of the object are likely to be released. Sometimes, this simply means that the final version of the object remains valid, but will never be upgraded. In other cases, however, when an object reaches the end of its life, use of that object should be actively discouraged. This can happen, for example, when a component is superceded by a totally new component that is not directly related to the previous one (and hence cannot be viewed as just a new version using VIGUID/VSGUID connection semantics).

When the chain of object versions is to be explicitly ended, a special "fend of life" (EOL) object is placed at the end of the version chain to act as a tombstone for the objects in the chain. In one implementation, EOL objects are indicated using a revision number value of 100,000 or greater. It is permissible (though rare) for an EOL object to be revised or upgraded, in which case, as usual, the Revision Number property will be incremented (for example, to 100,001). Thus, the "most recent" EOL object can be determined easily.

Component objects provide the most common use of EOL objects. When a component is retired, an EOL object for that component is added to the database to indicate that the component is no longer valid. The user interface tool is expected to recognize the special EOL version and handle it accordingly.

Figure 6:
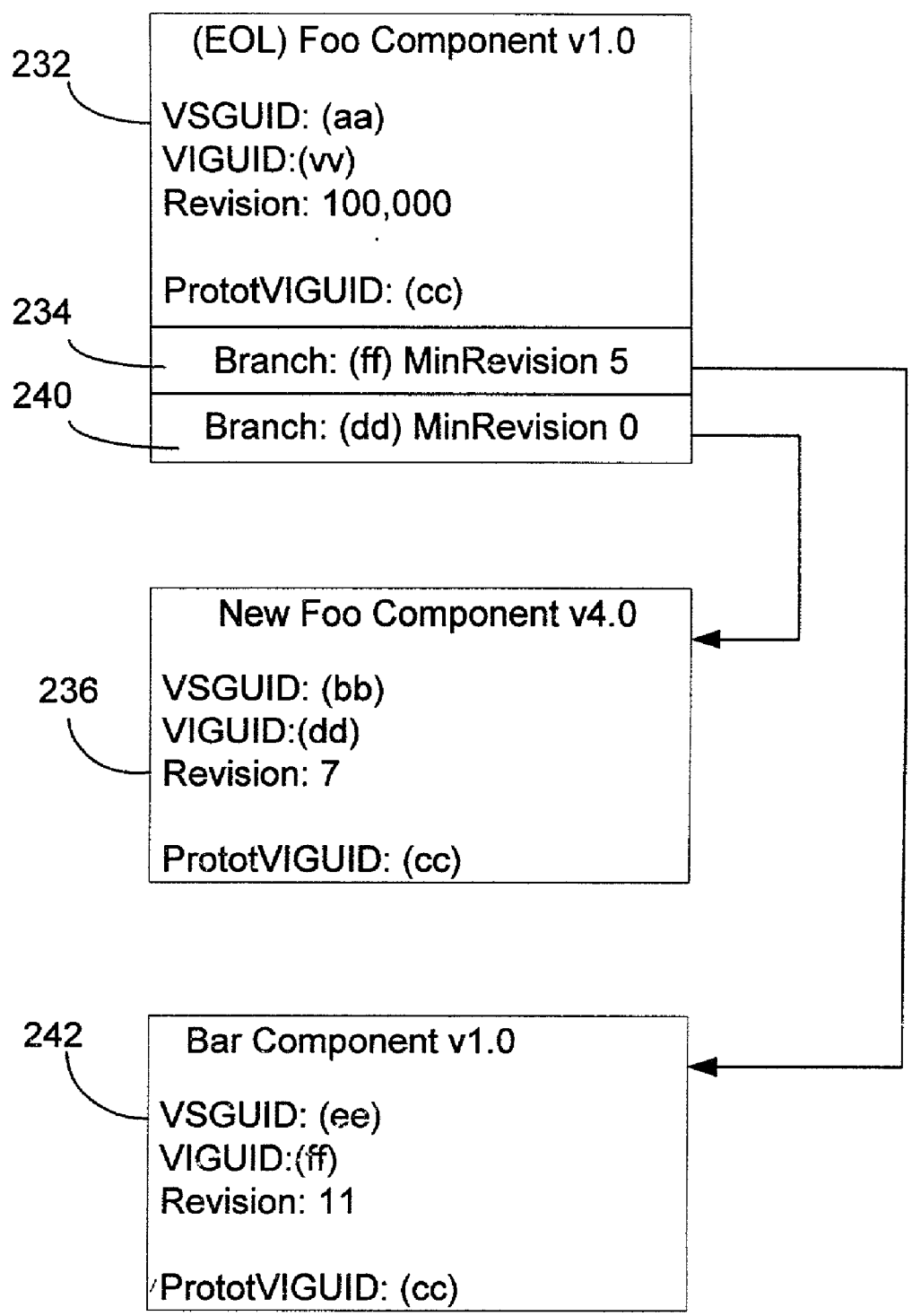
FIG. 6 is a schematic diagram showing an end-of-life component and replacement components thereof.

The versioning scheme also supports a special Branch resource that is only valid in an EOL component object. As shown in FIG. 6, an EOL component 232 named "Foo" and having a Version property of v1.0 includes a Branch resource 234 that has a property called TargetVIGUID, which contains the VIGUID of a replacement component. The Revision value of 100,000 marks the Foo v1.0 component as an EOL component. In the example illustrated in FIG. 6, the Branch resource 234 contains the VIGUID of a "New Foo v4.0" component 236. The Branch resource also contains an optional MinRevision property that indicates the minimum revision level of the target component that may be used as a replacement for the current component. If not specified or 0, any revision level of the replacement component may be used.

Depending on how the Branch resource in an EOL component is used, a number of different scenarios are possible. If the EOL component does not specify a Branch resource, then the component is dead, and has no replacement component. If the EOL component specifies a single Branch resource, then the component is replaced by the new component specified by the TargetVIGUID. The MinRevision property can be used to ensure that only appropriate versions of the new component are used.

In a different scenario, the EOL component has multiple Branch resources, and the component is replaced by all the components specified in the Branch resources. This scenario is illustrated in FIG. 6, where the Foo v3.4 component has two Branch resources 234 and 240, whose TargetVIGUID properties contain the VIGUIDs of the component New Foo v4.0 and a component 242 called "Bar v1.0", respectively. This indicates that the EOL Foo v3.4 component has been broken into two new components: New Foo and Bar.

In another scenario, several different EOL components may specify Branch resources that all reference the same target component. These EOL components are said to "fuse" into the single new component. Hybrid scenarios are also possible, where an EOL component fissions into several new components, some of which are fusions with other components. The flexible fission/fusion scheme enabled by Branch resources allows components to evolve over time, and to track the vagaries of software development processes.

Build Process

Figure 7:
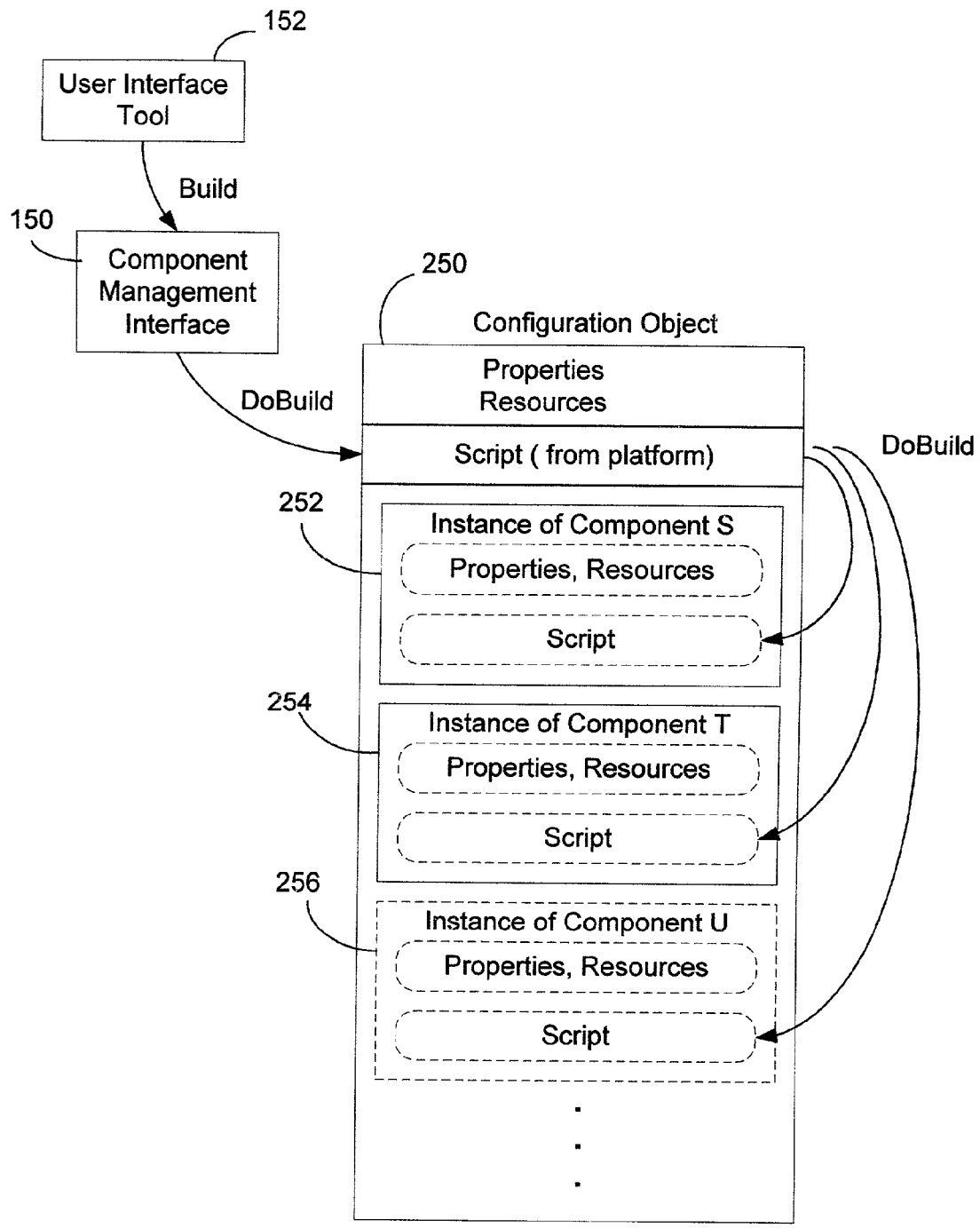
FIG. 7 is a schematic diagram showing a configuration object containing scripts that are invoked to build a run-time image.

In the process of constructing a configuration, the state data of the instance objects of the selected components as well as their script text are all included into the configuration object. By way of example, FIG. 7 shows a scenario in which components S, T, U and other components are included in a configuration 250. As a result, the component instances 252, 254', and 256 of the components S, T, and U are copied into the configuration 250. As shown in FIG. 7, the configuration object also has its own script, which is copied from the platform object.

When the user is satisfied with the selection of components for the configuration, she can initiate the build process by selecting a "Build" command through the user interface tool. In turn, the user interface tool 152 calls an API function called "Build" to ask the CMI 150 to start the build process. In response, the CMI 150 invokes a "DoBuild" method of the script of the configuration object 250. The configuration object then goes through the instance objects in the configuration and asks each of the component instances to build itself into the run-time image by invoking the "DoBuild" method in the script of that instance. As described above, the script of each instance provides the build logic for that instance. The build operation is completed when all of the instances have been built into the run-time image. As noted above, the script of the configuration object is obtained from the Platform object. Thus, it is ultimately the platform that defines the semantics of the general build operation.

Although the CMI 150 expects the script to handle all of the build (and other) logic associated with a particular platform, it does provide helper functions in Utility objects that assist in common build operations. During the build process, the CMI is responsible for providing services to the components to assist in building (e.g. services to copy files to the target). All other build processing is handled by either the platform script or component script. Typically, the platform script controls each phase of the build process and resolves the build dependency graph to control the order in which components are built into the final run-time. The combination of a multi-phase build and the rich semantics within the dependency graph allows the build process to handle any component interdependencies.

As mentioned above, a resource of an instance may include a Resource Type property that contains the GUID of a resource type object. In keeping with the componentization approach of the invention, the Resource Type object has its own properties, resources, and, inter alia, script that defines how to build a resource of its type. During the build process, the DoBuild method(s) in the script of an instance is invoked to build the instance, which includes setting up its resources. To that end, the Resource Type object is invoked to build the resource and then pass it to the component instance object.

In view of the many possible embodiments to which the principles of this invention may be applied, it should be recognized that the embodiment described herein with respect to the drawing figures is meant to be illustrative only and should not be taken as limiting the scope of invention. Therefore, the invention as described herein contemplates all such embodiments as may come within the scope of the following claims and equivalents thereof.

What is claimed is:

1. A computer-readable medium for execution on a platform having stored thereon a data structure containing description data for a first software program component, comprising:
    a first data field containing data specifying properties of the first software program component; and
    a second data field containing data specifying required resources of the first software program component, the data in the first data field including data identifying a second software program component having within properties, resources, and script defining a build behavior to be inherited by the first software program component, said script being invokable for building the first software program component into a ready-to-run, run-time image of a software program, the software program for subsequent use on another platform to directly control system resources of the other platform.

2. A computer-readable medium as in claim 1, wherein the data structure further includes a third data field containing data representing script defining a build behavior of the first software program component.

3. A computer-readable medium as in claim 1, wherein the data in the first field identifying the second software program component is a globally unique identification of the second software program component.

4. A computer-readable medium as in claim 1, wherein the data structure further includes a third data field containing data specifying dependency information with respect to other software program components.

5. A computer-readable medium having computer-executable instructions for execution on a platform for performing steps for managing software program components used for building run-time images, the steps comprising:
    identifying, from inheritance information provided in description data of a first software program component, an inheritance chain containing a plurality of software program components having within respective properties, resources, and build behavior script blocks;
    generating an instance of the first software program component, the instance having properties and resources obtained by collapsing properties and resources of the software program components in the inheritance chain, and having build behavior script obtained from coalescing build behavior script blocks of the software program components in the inheritance chain, said build behavior script being invokable for building the first software program component into a ready-to-run, run-time image of a software program, the software program for subsequent use on another platform to directly control system resources of the other platform.

6. A computer-readable medium as in claim 5, wherein the step of coalescing includes linking the build behavior script blocks of the software program components in the inheritance chain.

7. A computer-readable medium as in claim 5, wherein the inheritance information of the first software program component includes an identification of a second software program component serving as prototype of the first software program component.

8. A computer-readable medium as in claim 5, wherein the software program components are operating system components.

* * * * *